(12) United States Patent
Leung et al.

(10) Patent No.: US 7,813,920 B2
(45) Date of Patent: Oct. 12, 2010

(54) LEARNING TO REORDER ALTERNATES BASED ON A USER'S PERSONALIZED VOCABULARY

(75) Inventors: Brian Leung, Foster City, CA (US);
Michael Revow, Lincoln Square, WA (US)

(73) Assignee: Microsoft Corporation, Redmond, WA (US)

( * ) Notice: Subject to any disclaimer, the term of this patent is extended or adjusted under 35 U.S.C. 154(b) by 616 days.

(21) Appl. No.: 11/771,018

(22) Filed: Jun. 29, 2007

(65) Prior Publication Data

US 2009/0006095 A1 Jan. 1, 2009

(51) Int. Cl.
*G06F 17/21* (2006.01)
(52) U.S. Cl. .............................. 704/10; 704/9; 704/257
(58) Field of Classification Search .................... 704/1, 704/3, 7, 9, 10, 251, 257, 270, 4, 238, 240, 704/276; 382/115, 197
See application file for complete search history.

(56) References Cited

U.S. PATENT DOCUMENTS

| | | | |
|---|---|---|---|
| 5,829,000 | A | 10/1998 | Huang et al. |
| 6,088,669 | A | 7/2000 | Maes |
| 6,961,700 | B2 | 11/2005 | Mitchell et al. |
| 7,120,582 | B1 | 10/2006 | Young et al. |
| 7,162,423 | B2 | 1/2007 | Thrasher et al. |
| 7,254,269 | B2 * | 8/2007 | Nakagawa .................. 382/197 |
| 7,545,959 | B2 * | 6/2009 | Houle et al. ................ 382/115 |
| 2002/0057842 | A1 | 5/2002 | Yuen |
| 2005/0075876 | A1 | 4/2005 | Tsuruta |
| 2005/0099398 | A1 | 5/2005 | Garside et al. |

OTHER PUBLICATIONS

Rachel Gayle Jull: How Does Bilingualism Matter? A Meta-Analytic Tale of Two Hemispheres http://txspace.tamu.edu/bitstream/1969.1/240/1/etd-tamu-2003A-2003032723-Hull-1.pdf May 2003.
CalliGrapher 8.5 for Pocket PCs http://www.phatware.com/calligrapher/ PhatWare® Corporation, 1997-2007.
Edward C. Kaiser: Can Modeling Redundancy in MultiModal, Multi-party Tasks Support Dynamic Learning? http://caIoproject.sri.com/publications/downloads/kaiser/canmodelingredundancy-kaiser.pdf vol. 88, Issue 8, Aug. 2000, pp. 1297-1313. DOBI: 10.1109/5.880085.
Waibel, A. et al.: Multilinguality in Speech and Spoken Language Systems http://ieeexplore.ieee.org/Xplore/login.jsp?url=/iel5/5/19040/00880085.pdf, Aug. 2000.

* cited by examiner

*Primary Examiner*—Huyen X. Vo
(74) *Attorney, Agent, or Firm*—Merchant & Gould P.C.

(57) ABSTRACT

Learning to reorder alternates based on a user's personalized vocabulary may be provided. An alternate list provided to a user for replacing words input by the user via a character recognition application may be reordered based on data previously viewed or input by the user (personal data). The alternate list may contain generic data, for example, words for possible substitution with one or more words input by the user. By using the user's personal data and statistical learning methodologies in conjunction with generic data in the alternate list, the alternate list can be reordered to present a top alternate that more closely reflect the user's vocabulary. Accordingly, the user is presented with a top alternate that is more likely to be used by the user to replace data incorrectly input.

18 Claims, 4 Drawing Sheets

US 7,813,920 B2

LEARNING TO REORDER ALTERNATES BASED ON A USER'S PERSONALIZED VOCABULARY

BACKGROUND

Learning to reorder alternates based on a user's personalized vocabulary is a process for suppressing unused words in a system lexicon of a text recognition application using statistical learning methodologies and a user's personal data. When using an alternative input system, for example, a speech recognition system or a handwriting recognition system, the system lexicon is used to find an N best set of words that may match a user's input and present to the words to the user in the form of an 'alternate' list.

In such systems, the system lexicon is designed to include words that are used by a wide range of users. As a result, the conventional system lexicon constantly accumulates words that can be provided as alternates to the user. However, the conventional system lexicon often provides alternates to the user that have not been used by the user which cause the user to navigate through alternates that may not be useful to the user.

In view of the foregoing, methods and systems for learning to reorder alternates based on a user's personalized vocabulary are provided. Furthermore, there is need to apply statistical learning methodologies to reorder an alternate list based on a user's vocabulary usage and also to suppress or bias against words that have never been used. It is with respect to these and other considerations that the present invention has been made.

SUMMARY

Learning to reorder alternates based on a user's personalized vocabulary may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

An alternate list may be provided to a user as candidates to replace a result output from a text recognition application in response to user input that most likely reflects a word associated with user's vocabulary. The alternate list may be reordered based on data previously viewed or input by the user (personal data). The alternate list may contain generic data, for example, words for possible substitution with one or more words input by the user. By using the user's personal data and statistical learning methodologies in conjunction with generic data when generating the alternate list, the alternate list can be reordered to present a top alternate that more closely reflects the user's vocabulary. Accordingly, the user is presented with a top alternate that is more likely to be a correct response to the user's input.

In accordance with one embodiment, a method is provided for suppressing words in a system lexicon that have never been used by the user as part of the recognition process. Upon receiving input through a text recognition application, an alternate list is generated to provide alternates for possible data substitution. The method determines whether the alternate list should be post processed based on predetermined criteria. The method post processes the alternate list using statistical learning methodologies when post processing is deemed necessary and presents the alternate list via an output device.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
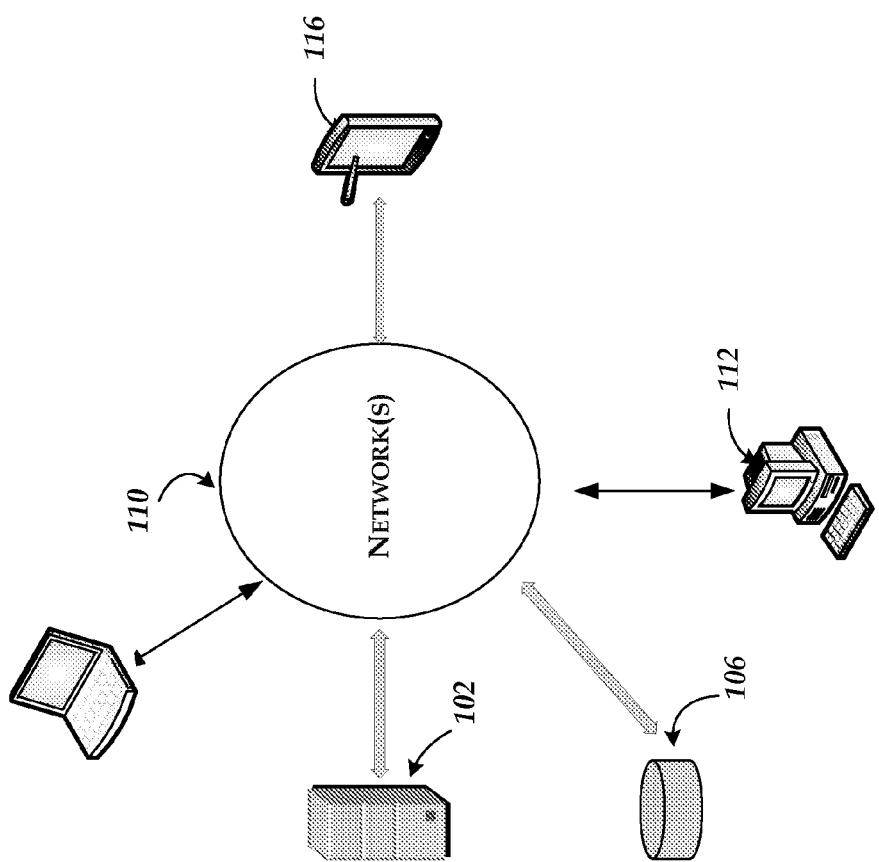
FIG. 1 illustrates a networked operating environment where embodiments may be practiced.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Consistent with embodiments of the present invention, a method and system for learning to reorder alternates based on a user's personalized vocabulary is disclosed. Often, when data is input into a computer application, for example, text, the data is input incorrectly. Accordingly, many systems often present a user with possible alternate words for substituting words input by the user. The alternate words presented to the user are gathered from a system lexicon or application wordlist containing a generic set of words for presentation to the user as an alternate. However, the generic set of words is quite sizeable, which leads to a number of words being presented in the alternate list that are not relevant to the user. Accordingly, an embodiment of the invention may provide a user with an alternate list that more closely reflects a user's vocabulary by reordering the alternates like based on the user's personal data.

An embodiment consistent with the invention may include a system for suppressing a lexicon. The system may comprise a memory storage and a processing unit coupled to the memory storage. The processing unit may be operative to receive input using a character recognition application. In response to the received input, the system may also generate an alternate list for use in substituting alternate data for the received input and determine whether the alternate list should be post processed based on predetermined criteria. The system may also post process the alternate list using statistical learning methodologies when the predetermined criteria indicates that post processing should occur. During post processing, the system reorders the alternate list. The system may also present the alternate list using an output device. The system may comprise a recognizer for reordering the alternate list, wherein the recognizer uses statistical learning methodologies and personalized data to reorder the alternate list.

Referring to FIG. 1, a computer system 100 is illustrated where example embodiments may be implemented. The computer system 100 may include a computer network 110, a server 102 which manages a database 106, a desktop computer 112, a laptop computer 114, and a tablet personal computer (PC) 116.

The computer system 100 may transmit and receive data to and from other computing devices such as the server 102, the desktop computer 112, the laptop computer 114, and the computer lab 125 using the computer network 110. Furthermore, the computer system 100 may transmit or receive data to a storage system 106, which is managed by server 102 using the computer network 110. Alternatively, the desktop computer 112, laptop computer 114 and tablet PC may operate independently of the computer network 110. Other computing devices may also participate in the computer system 100. The computer network 110 may include a secure network such as an enterprise network, or an unsecure network such as a wireless open network. By way of example, and not limitation, the computer network 110 may include wired media such as a wired network or direct-wired connection, and wireless media such as acoustic, RF, infrared and other wireless media.

Figure 2:
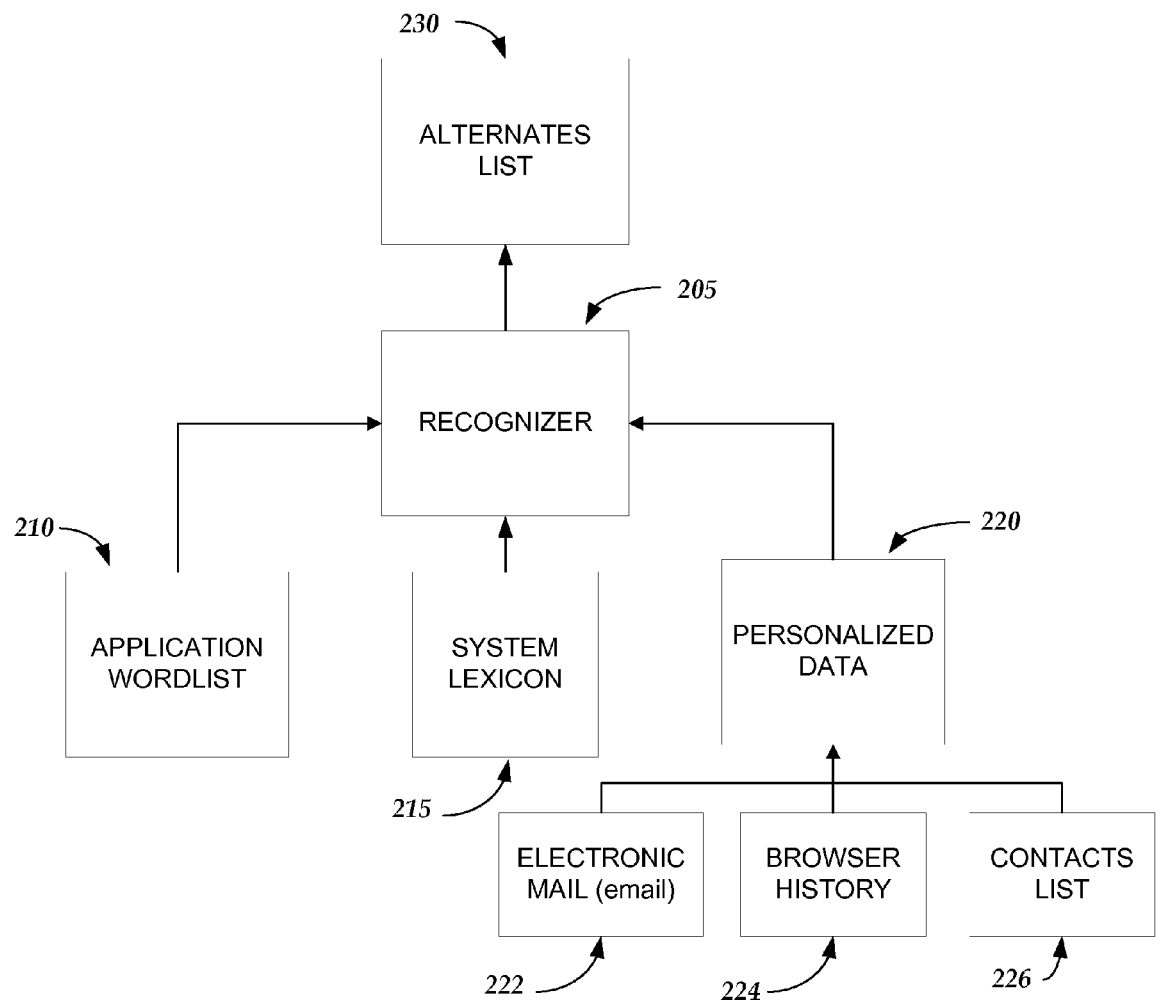
FIG. 2 is a block diagram illustrating generating an alternate list.

FIG. 2 is a block diagram 200 illustrating forming an alternate list in the networked operating environment of FIG. 1. Recognizer 205 may acquire alternate words from one or more data resources, for example, application wordlist 210, system lexicon 215 and personalized data 220. The recognizer 205 may also user additional wordlists to acquire alternate words, for example, a catchall wordlist that includes words that do not reside in the application wordlist 210, system lexicon 215 and personalized data 220. The recognizer 205 may acquire the alternate words from the application wordlist using one or more published application program interfaces (API)s. The recognizer 205 may also acquire the alternate words from the personalized data through an interaction with one or more user data stores, such as a file system, API, or the like. The personalized data 210 harvests data from a user's electronic mail (email) 222, browser history 224 and contacts list 226 to obtain words previously used by the user. For example, the data may be harvested by querying a desktop search indexing service to obtain words previously used. The recognizer 205 generates alternate list 230.

When generating the alternate list 230, the recognizer 205 uses statistical learning methodologies to order the words found in the application wordlist 210, system lexicon 215 and personalized data 220 which best match the user input. Accordingly, the alternate list 230 provides the user with a top alternate from the alternate list 230 that more closely reflects the user's input. The recognizer 205 may employ a variety of language models and data structures to suppress unused words returned as a top alternate and reorder the alternate list 230. For example, the recognizer 205 may utilize a neural network, a support vector machine, a Bayesian network, simple linear regression, maximum entropy classifiers, or the like. By using recognizer 205 to suppress unused words and reorder the alternate list 230, the alternate list 230 may be reordered in a manner that more accurately reflects a top alternate that has been used by the user for presentation.

Figure 3:
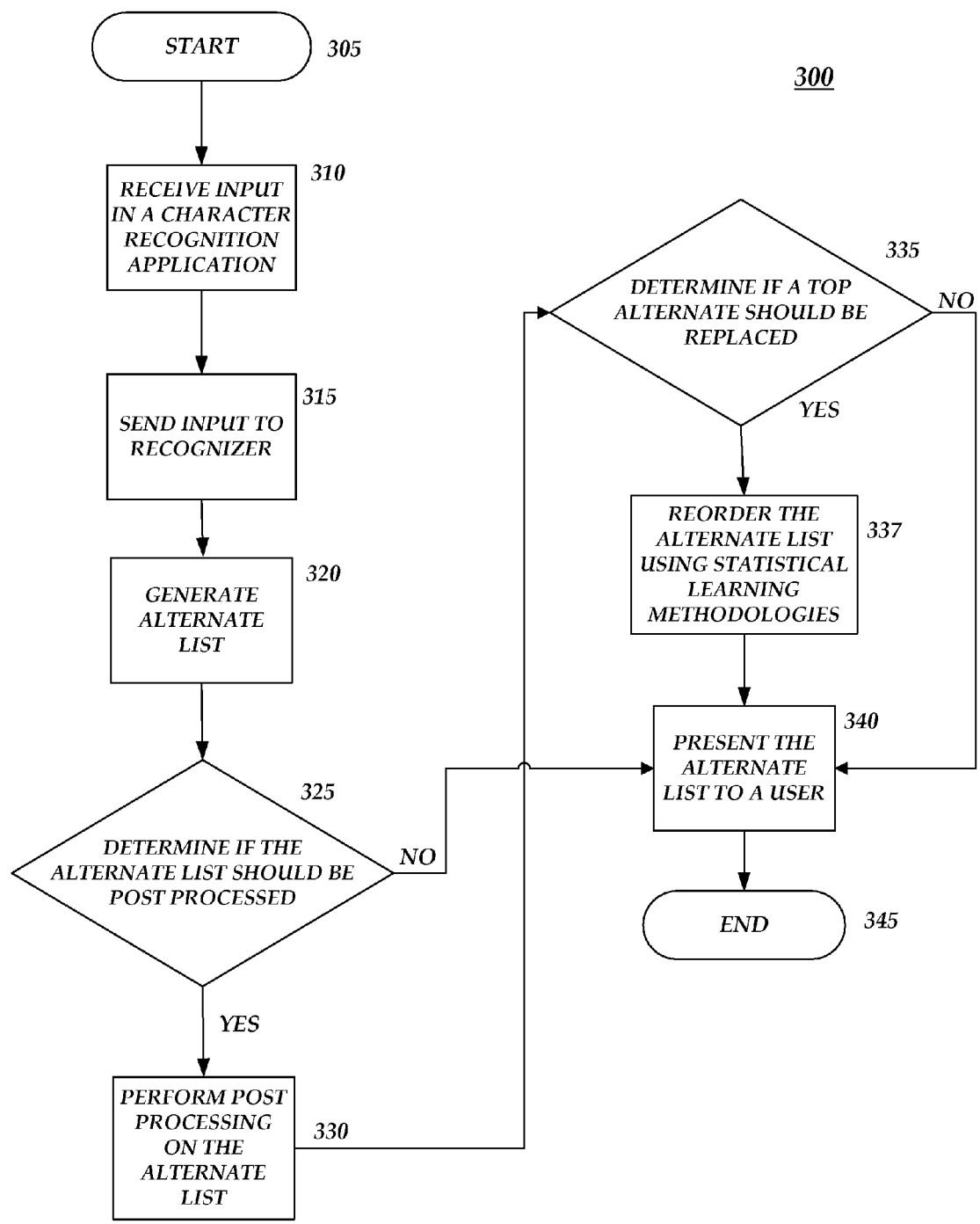
FIG. 3 is a flow chart of a method for suppressing a system lexicon.

FIG. 3 is a flow chart setting forth the general stages involved in a method 300 consistent with an embodiment of the invention for suppressing unused words in a system lexicon using a computing device of FIG. 1. Ways to implement the stages of method 300 will be described in greater detail below. Method 300 may begin at starting block 305 and proceed to stage 310 where input, for example, text, is received by a character recognition application. For example, the character recognition application may be a speech recognition application, handwriting recognition application or the like. At stage 315, the received input is sent to a recognizer 205 to provide alternates to a user for text substitution. At stage 320, the recognizer 205 generates an alternate list 230 for potential text substitution. For example, the alternate list 230 may be used by a user that desires to replace a word which the user incorrectly input. At stage 325, the recognizer 205 determines if the alternate list 230 should be post processed. For example, if the recognizer 205 has not acquired a predetermined amount of data from the application wordlist 210, the system lexicon 215 or the personalized data 220, post processing does not occur, and the method 300 proceeds to stage 340. For example, if a top alternate, an alternate that is determined to be a word most likely intended to be input by the user, is not a word in the system lexicon 215, the method 300 proceeds to stage 340. If the recognizer 205 determines that post processing should occur, the method 300 proceeds to stage 330.

At stage 330, the recognizer 205 performs post processing on the alternate list 230 to refine the alternate list based on the user's personalized data 220. During post processing, the recognizer 205 performs a variety of functions on the alternate list 230 using statistical learning methodologies to normalize and reorder alternates in the alternate list 230. The recognizer 205 also uses data acquired from personalized data 220 when reordering the alternate list 230. The post processing may perform reordering of alternates in the alternate list 230 using, but not limited any combination of the following: logging a probability of an alternate word in the alternate list 230 being contained in the personalized data 220 (frequency of an alternate word in personalized data 220), logging a probability of an alternate word in the alternate list 230 being contained in the system lexicon 215 (frequency of an alternate word in system lexicon 215), determining the edit distance between two alternates to determine the smallest amount of changes needed to change an existing word to another word, determining if a top alternate in the alternate list 230 is capitalized, determining if the top alternate contains any leading punctuation, determining if the top alternate contains any trailing punctuation, determining if any other alternates in the alternate list 230 are capitalized, determining if any other alternates in the alternate list 230 contains any leading punctuation, determining if any other alternates in the alternate list 230 contains any trailing punctuation, comparing the top alternate and other alternates in the alternate list 230 to determine if differences exist, comparing leading punctuation for the top alternate and other alternates in the alternate list 230 to determine if differences exist, comparing trailing punctuation for the top alternate and other alternates in the alternate list 230 to determine if differences exist, and producing a replacement score for each alternate in the alternate list 230. By implementing any of the post processing steps, the recognizer 205 learns how to more effectively provide alternates to the user that are more likely desired by the user because the recognizer 205 becomes more familiar with a user's vocabulary.

At stage 335, the recognizer 205 determines if the top alternate in the alternate list 230 should be replaced with another alternate in the alternate list 230 based on the replacement score assigned to each alternate in the alternate list 230.

For example, the recognizer 205 may reorder the alternate list 230 by replacing the top alternate with another alternate (swap alternates) in the alternate list 230 when the top alternate has been used less frequently than another alternate, or when the top alternate has never been used by the user. At stage 337, the recognizer 205 re-orders alternates list 230 using statistical learning methodologies when the recognizer 205 determines that one or more alternates in the alternates list 230 should be reordered. At stage 340, the recognizer 205 presents the alternate list 230 to the user. Method 300 ends at ending block 345.

Figure 4:
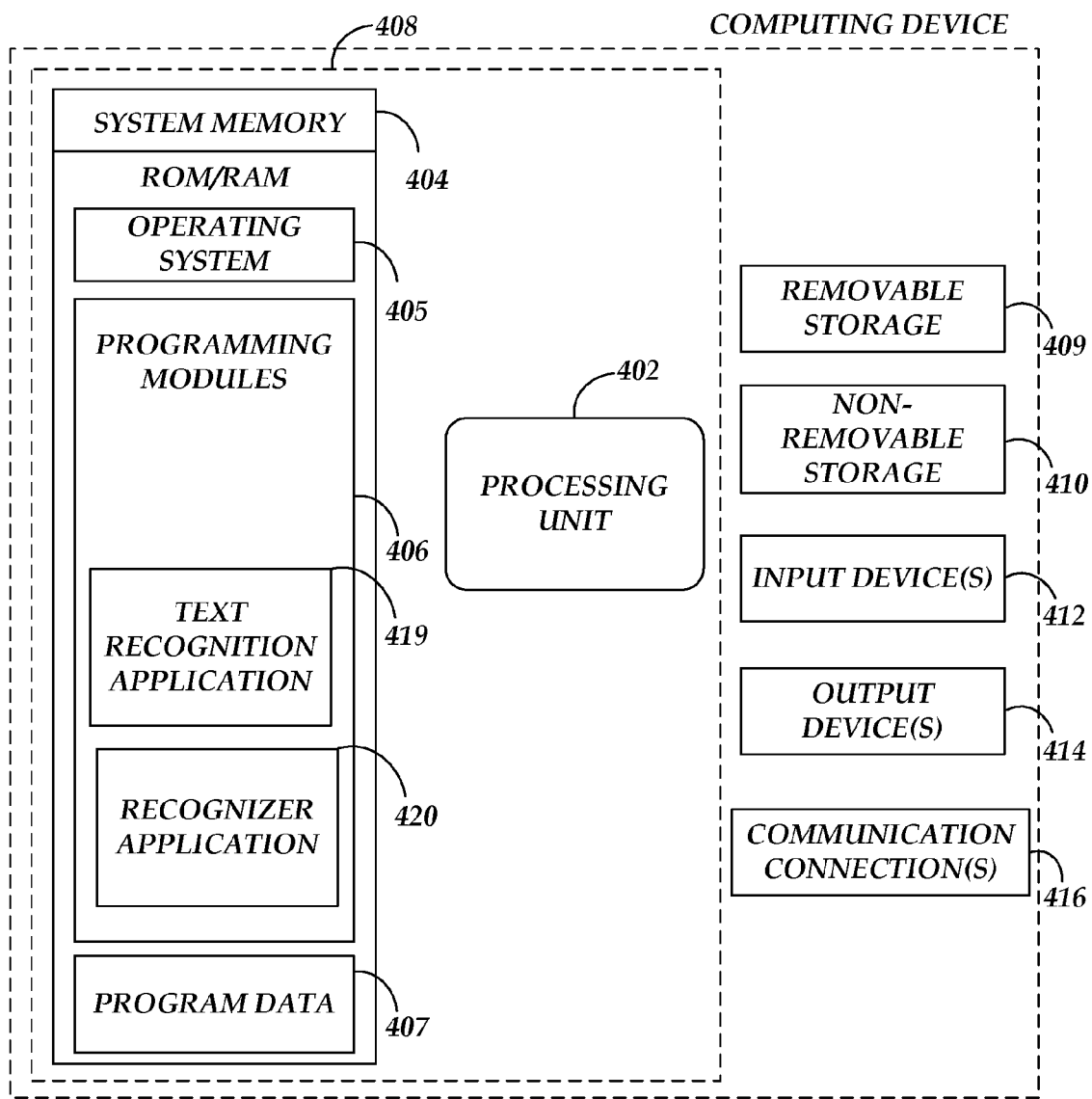
FIG. 4 is a block diagram of a system including a computing device for use in the networked operating environment of FIG. 1.

FIG. 4 is a block diagram of a system including a computing device 400, which may be used in conjunction with server 102, desktop computer 112, laptop computer 114 and tablet PC 116. Consistent with an embodiment of the invention, any suitable combination of hardware, software, or firmware may be used to implement a memory storage and processing unit. For example, the memory storage and processing unit may be implemented with the computing device 400 or any of the other computing devices in combination with the computing device 400. The aforementioned system, device, and processors are examples and other systems, devices, and processors may comprise the aforementioned memory storage and processing unit, consistent with embodiments of the invention. Furthermore, the computing device 400 may comprise an operating environment for an associated system. The system may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a program data 407. Operating system 405, for example, may be suitable for controlling computing device 400's operation. In one embodiment, programming modules 406 may include a document creation application for creating and editing a document. Programming modules 406 may include a character recognition application 419 for receiving input, for example, text, and recognizer application 420 for generating, normalizing and reordering an alternate list associated with the received input. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also employ input device(s) 412 such as a keyboard, a mouse, a pen, a sound input device, a touch input device, etc. Output device(s) 414 such as a display, speakers, a printer, etc. may also be included. The aforementioned devices are examples and others may be used.

Computing device 400 may also contain a communication connection 416 that may allow device 400 to communicate with other computing devices, such as over network 110 in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 may perform processes including, for example, one or more method stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as show in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for altering an ordered list associated with a system lexicon associated with a recognition process, the method comprising:
   receiving, by a computing device, input using a character recognition application, the input comprising at least one word associated with a user's vocabulary;
   in response to the received input, generating, by the computing device, an alternate list for use in substituting alternate data for the received input;
   determining, by the computing device, whether the alternate list should be post processed based on predetermined criteria;
   post processing, by the computing device, the alternate list using statistical learning methodologies when the predetermined criteria indicates that post processing should occur, wherein the post processing reorders the alternate list, wherein post processing performs a combination of the following: logging a probability of each alternate word in personalized data, logging a probability of each alternate word in a system lexicon, determining an edit distance between each alternate in the alternate list, determining whether a top alternate is capitalized, determining whether the top alternate contains leading punctuation, determining whether the top alternate contains trailing punctuation, determining whether another alternate in the alternate list is capitalized, determining whether another alternate in the alternate list contains leading punctuation, determining whether another alternate in the alternate list contains trailing punctuation, determining whether a capitalization difference exists between the top alternate and another alternate in the alternate list, determining whether leading punctuation matches between the top alternate and another alternate in the alternate list, determining whether trailing punctuation matches between the top alternate and another alternate in the alternate list and generating a replacement score for each alternate in the alternate list; and
   presenting, by the computing device, the alternate list using an output device.

2. The method of claim 1, wherein a recognizer generates the alternate list and applies post processing to the alternate list.

3. The method of claim 2, wherein the recognizer uses personalized data to reorder the alternate list.

4. The method of claim 3, wherein the personalized data is harvested by querying a search indexing service to obtain words previously used by the user and wherein the personalized data is harvested from at least one of the following: a browser history of the user and a contacts list of the user.

5. The method of claim 2, wherein the recognizer uses of one of the following statistical learning methodologies when post processing the alternate list: a neural network, a support vector machine, a Bayesian network, a simple linear regression network and a network using a maximum entropy classifier.

6. The method of claim 2, wherein the recognizer generates a replacement score for each alternate in the alternate list.

7. The method of claim 6, wherein the recognizer reorders the alternate list based on the replacement score for each alternate in the alternate list.

8. The method of claim 1, wherein post processing does not occur when data harvested from one or more data resources falls below a predetermined level.

9. The method of claim 1, wherein post processing does not occur when a top alternate within the alternate list is not associated with a system lexicon.

10. The method of claim 1, wherein the received input is sent by at least one of the following: a handwriting recognition application and a speech recognition application.

11. A system for suppressing a system lexicon, the system comprising:
   a memory storage for storing data, wherein the memory storage is searchable;
   a processing unit coupled to the memory storage, wherein the processing unit is operative to:
      receive input using a character recognition application, the input comprising at least one word associated with a user's vocabulary;
      in response to the received input, generate an alternate list for use in substituting alternate data for the received input;
      determine whether the alternate list should be post processed based on predetermined criteria;
      post process the alternate list using statistical learning methodologies when the predetermined criteria indicates that post processing should occur, wherein the post processing reorders the alternate list, wherein post processing performs a combination of the following: logging a probability of each alternate word in personalized data, logging a probability of each alternate word in a system lexicon, determining an edit distance between each alternate in the alternate list, determining whether a top alternate is capitalized, determining whether the top alternate contains leading punctuation, determining whether the top alternate contains trailing punctuation, determining whether another alternate in the alternate list is capitalized, determining whether another alternate in the alternate list contains leading punctuation, determining whether another alternate in the alternate list contains trailing punctuation, determining whether a capitalization difference exists between the top alternate and another alternate in the alternate list, determining whether leading punctuation matches between the top alternate and another alternate in the alternate list, determining whether trailing punctuation matches between the top alternate and another alternate in the alternate list and generating a replacement score for each alternate in the alternate list;
      present the alternate list using an output device; and
   a recognizer for reordering the alternate list, wherein the recognizer uses statistical learning methodologies and personalized data to reorder the alternate list.

12. The system of claim 11 further comprising at least one of the following: a handwriting recognition application and a speech recognition application.

13. The system of claim 11, wherein the recognizer receives data from at least one of the following: an application wordlist, a system lexicon and personalized data.

14. The system of claim 13, wherein the personalized data harvests data from at least one of the following: one or more electronic mail (Email) messages, a browser history, and a contacts list.

15. The system of claim 11, wherein the recognizer uses of one of the following: a neural network, a support vector machine, a Bayesian network, a simple linear regression network and a network using a maximum entropy classifier.

16. A tangible computer-readable storage medium which stores a set of instructions which when executed performs a method for suppressing a system lexicon, the method executed by the set of instructions comprising:
   receiving input using a character recognition application, the input comprising at least one word associated with a user's vocabulary; and
   sending the received input to a recognizer, wherein the recognizer,
      generates an alternate list for use in substituting alternate data for the received input;
      determines whether the alternate list should be post processed based on predetermined criteria;
      post processes the alternate list using statistical learning methodologies when the predetermined criteria indicates that post processing should occur, wherein the post processing reorders the alternate list, wherein post processing performs a combination of the following: logging a probability of each alternate word in personalized data, logging a probability of each alternate word in a system lexicon, determining an edit distance between each alternate in the alternate list, determining whether a top alternate is capitalized, determining whether the top alternate contains leading punctuation, determining whether the top alternate contains trailing punctuation, determining whether another alternate in the alternate list is capitalized, determining whether another alternate in the alternate list contains leading punctuation, determining whether another alternate in the alternate list contains trailing punctuation, determining whether a capitalization difference exist between the top alternate and another alternate in the alternate list, determining whether leading punctuation matches between the top alternate and another alternate in the alternate list, determining whether trailing punctuation matches between the top alternate and another alternate in the alternate list and generating a replacement score for each alternate in the alternate list; and
      presents the alternate list via an output device.

17. The tangible computer-readable storage medium of claim 16, wherein the recognizer receives data from at least one of the following: an application wordlist, a system lexicon and personalized data.

18. The tangible computer-readable storage medium of claim 17, wherein the personalized data harvests data from at least one of the following: one or more electronic mail (Email) messages, a browser history, and a contacts list.

* * * * *